(12) United States Patent
Yamane et al.

(10) Patent No.: US 7,394,643 B2
(45) Date of Patent: Jul. 1, 2008

(54) LAMINATED ELECTRONIC COMPONENT

(75) Inventors: Tomonori Yamane, Kariya (JP); Ichiro Kazama, Akita (JP)

(73) Assignee: TDK Corporation, Tokyo (JP)

( * ) Notice: Subject to any disclaimer, the term of this patent is extended or adjusted under 35 U.S.C. 154(b) by 138 days.

(21) Appl. No.: 11/341,367

(22) Filed: Jan. 30, 2006

(65) Prior Publication Data
US 2006/0187612 A1 Aug. 24, 2006

(30) Foreign Application Priority Data

| Jan. 31, 2005 | (JP) | ............................... 2005-023447 |
| Feb. 18, 2005 | (JP) | ............................... 2005-042754 |

(51) Int. Cl.
*H01G 4/005* (2006.01)
(52) U.S. Cl. ................. 361/303; 361/306.1; 361/306.3; 361/311; 361/313; 361/321.1; 361/321.2
(58) Field of Classification Search ................. 361/303, 361/306.1, 306.3, 321.1, 321.2, 311–313, 361/301.1, 305, 308.1, 321.5
See application file for complete search history.

(56) References Cited

U.S. PATENT DOCUMENTS

| 5,072,329 | A | * | 12/1991 | Galvagni | ................. | 361/321.2 |
| 5,835,338 | A | * | 11/1998 | Suzuki et al. | ............ | 361/301.4 |
| 6,195,249 | B1 | * | 2/2001 | Honda et al. | ............ | 361/306.3 |
| 6,292,351 | B1 | * | 9/2001 | Ahiko et al. | ............ | 361/306.3 |
| 6,606,237 | B1 | * | 8/2003 | Naito et al. | ............. | 361/306.3 |
| 6,621,682 | B1 | * | 9/2003 | Takakuwa et al. | ........ | 361/306.3 |
| 6,657,848 | B2 | * | 12/2003 | Togashi et al. | ........... | 361/306.3 |
| 6,940,710 | B1 | * | 9/2005 | Lee et al. | ................. | 361/321.2 |
| 7,050,288 | B2 | * | 5/2006 | Ahiko et al. | ................ | 361/303 |
| 2003/0231457 | A1 | | 12/2003 | Ritter et al. | | |

FOREIGN PATENT DOCUMENTS

| JP | 61-183913 | 8/1986 |
| JP | 04-302118 | 10/1992 |
| JP | 09-190946 | 7/1997 |
| JP | 09-260207 | 10/1997 |
| JP | 2000-133545 | 5/2000 |
| JP | 2003-282356 | 10/2003 |
| JP | 2004-40084 | 2/2004 |

* cited by examiner

*Primary Examiner*—Nguyen T. Ha
(74) *Attorney, Agent, or Firm*—Oblon, Spivak, McClelland, Maier & Neustadt, P.C.

(57) ABSTRACT

The present invention is intended to provide a laminated electronic component having a configuration in which the number of extraction electrodes is reduced to realize a high ESR, the adhesion of a terminal electrode with respect to an ECA is increased and a short-circuit defect between an internal electrode and a dummy electrode can be prevented. An electrode layer in the ECA includes the internal electrode, the extraction electrode and the dummy electrode. One end of the extraction electrode is connected with the internal electrode in the same layer, and the other end of the same is led onto a side surface of the ECA 1 to be connected with the terminal electrode. This is also applied to other extraction electrodes. The dummy electrode is arranged apart from the internal electrode and the extraction electrode in the same layer, has one end led onto the side surface of the ECA to be connected with the terminal electrode and has the same polarity as seen from a relationship with the internal electrode in the same layer. This is also applied to other dummy electrodes.

20 Claims, 5 Drawing Sheets

LAMINATED ELECTRONIC COMPONENT

BACKGROUND OF THE INVENTION

1. Field of the Invention

The present invention relates to a laminated electronic component including a plurality of terminal electrodes.

2. Description of the Related Art

In an electric supply source of a central processing unit (CPU) mounted in a digital electronic device, a reduction in voltage advances while a load current is increased. Therefore, suppressing a fluctuation in power supply voltage within an allowable value range with respect to a sudden change in load current becomes very difficult, and hence a multilayer capacitor called a decoupling capacitor is connected with a power supply. Further, at the time of a transitional fluctuation in load current, a current is supplied from this multilayer capacitor to a CPU, thereby suppressing a fluctuation in power supply voltage.

In recent years, with a further increase in an operating frequency of a CPU, a load current and its speed are increased. Therefore, in the multilayer capacitor used as the decoupling capacitor, there is a demand for an increase in equivalent series resistance (ESR).

In a multiterminal type multilayer capacitor disclosed in Patent Reference 1, an extraction electrode for connection with a terminal electrode is provided to an internal electrode in each layer of a ceramic element assembly, and such an extraction element is led onto a side surface of the ceramic element assembly. The terminal electrode is formed on the side surface of the ceramic element assembly by plating or the like and joined to the extraction electrode.

In order to obtain a high ESR in this type of multilayer capacitor, the number of layers must be reduced, and the number of the extraction electrodes provided in each layer must be also decreased.

Further, in the multilayer capacitor, from the viewpoint of preventing exfoliation of the terminal electrode due to a thermal shock, the adhesion of the terminal electrode with respect to the multilayer capacitor element assembly must be increased. As this technique, like a technology described in Patent Reference 1, there can be considered a configuration in which a plurality of extraction electrodes are provided to one internal electrode to increase the number of the extraction electrodes and the number of the extraction electrodes joined to each terminal electrode is increased.

In this configuration, however, since the number of the extraction electrodes is increased, realization of a high ESR is obstructed.

Furthermore, the multilayer capacitor disclosed in Patent Reference 1 includes a configuration in which an internal electrode and a dummy electrode having a polarity different from that of the internal electrode are provided in the same layer. Therefore, a short-circuit defect may possibly occur between the internal electrode and the dummy electrode which has a different polarity and is provided in the same layer.

Patent Reference 1: Japanese Patent Application Laid-open No. 2004-40084

SUMMARY OF THE INVENTION

It is an object of the present invention to provide a laminated electronic component in which the number of extraction electrodes is reduced to increase an ESR.

It is another object of the present invention to provide a laminated electronic component in which the adhesion of a terminal electrode with respect to an electronic component element assembly is increased.

It is still another object of the present invention to provide a laminated electronic component which can prevent a short-circuit defect between an internal electrode and a dummy electrode.

To attain these objects, a laminated electronic component according to the present invention includes: an electronic component element assembly (hereinafter referred to as ECA); and a terminal electrode provided on a side surface of the ECA.

The ECA includes a plurality of electrode layers superimposed with ceramic layers therebetween, and the electrode layer includes an internal electrode, an extraction electrode and a dummy electrode.

One end of the extraction electrode is connected with the internal electrode in the same layer, and the other end of the same is led onto the side surface of the ECA to be connected with the terminal electrode.

The dummy electrode is arranged apart from the internal electrode and the extraction electrode in the same layer, has one end led onto the side surface of the ECA to be connected with the terminal electrode, and has the same polarity as seen from a relationship with the internal electrode in the same layer.

The above-described laminated electronic component according to the present invention includes: an ECA; and a terminal electrode provided on a side surface of the ECA. The ECA includes a plurality of electrode layers superimposed with ceramic layers therebetween. Therefore, a basic configuration of the laminated electronic component can be obtained.

The electrode layer includes an internal electrode and an extraction electrode. One end of the extraction electrode is connected with the internal electrode in the same layer, and the other end of the same is led onto the side surface of the ECA to be connected with the terminal electrode. Therefore, there can be obtained a basic electric circuit extending from the terminal electrode on the side surface of the ECA to the internal electrode through the extraction electrode.

The electrode layer further includes a dummy electrode, and the dummy electrode has one end led onto the side surface of the ECA to be connected with the terminal electrode. Therefore, the terminal electrode is provided with a connection structure with respect to the extraction electrode as well as a connection structure with respect to the dummy electrode, and hence the terminal electrode is appressed against the ECA through the connection structure with respect to the dummy electrode. Therefore, the small number of the extraction electrodes can be maintained to increase the ESR, whilst the adhesion of the terminal electrode with respect to the ECA can be increased.

Furthermore, the dummy electrode has the same polarity as seen from the relationship with the internal electrode in the same layer, thereby preventing a short-circuit defect between the internal electrode and the dummy electrode. A polarity of the dummy electrode is determined in accordance with a polarity of the terminal electrode connected with this dummy electrode.

Preferably, in at least one of the electrode layers, a plurality of dummy electrodes are provided, these dummy electrodes are arranged apart from the internal electrode and the extraction electrode in the same layer, one end of the dummy electrode is led onto the side surface of the ECA to be connected with the terminal electrode, and the dummy electrode have the same polarity as seen from a relationship with the internal electrode in the same layer. According to this configuration, the adhesion of the terminal electrode with respect to the ECA can be further increased, and a short-circuit defect between the internal electrode and the dummy electrode can be prevented.

Preferably, the plurality of terminal electrodes are provided on the side surface of the ECA, and the terminal electrodes which are adjacent to each other on the side surface of the ECA have different polarities. According to this configuration, an ESL (an equivalent series inductance) can be reduced.

Preferably, the ECA is provided with a dummy electrode layer in an outer layer as seem from the electrode layers superimposed with ceramic layers therebetween. The dummy electrode layer includes a second dummy electrode, and one end of the second dummy electrode is led onto the side surface of the ECA to be connected with the terminal electrode. According to this configuration, the terminal electrode is provided with a connection structure with respect to the dummy electrode as well as a connection structure with respect to the second dummy electrode, thus further increasing the adhesion of the terminal electrode with respect to the ECA.

More preferably, in at least one of the dummy electrode layers, the plurality of second dummy electrodes are provided, one end of each of these second dummy electrodes is led onto the side surface of the ECA to be connected with the terminal electrode, and the second dummy electrodes have the same polarity. According to this configuration, the adhesion of the terminal electrode with respect to the ECA can be further increased, and a short-circuit defect between the second dummy electrodes can be prevented.

As another aspect, it is possible to take a configuration in which a dummy electrode is not provided in a region between an internal electrode and a terminal electrode having a polarity different from that of the internal electrode. In this case, a dummy electrode layer is provided in an outer layer portion. The dummy electrode layer includes an outer layer dummy electrode, and one end of the outer layer dummy electrode is led onto the side surface of the ECA to be connected with the terminal electrode.

In the laminated electronic component according to the above-described aspect, since the dummy electrode is not provided in the region between the internal electrode and the terminal electrode having a polarity different from that of this internal electrode, a short-circuit defect between the internal electrode and the dummy electrode can be prevented.

Moreover, the dummy electrode layer is provided in the outer layer portion of the ECA, this dummy electrode layer includes the outer layer dummy electrode, and one end of the outer layer dummy electrode is led onto the side surface of the ECA to be connected with the terminal electrode. Therefore, the terminal electrode is provided with a connection structure with respect to the outer layer dummy electrode, and hence the terminal electrode is appressed against the ECA through the connection structure with respect to the outer layer dummy electrode. Accordingly, a short-circuit defect can be prevented, and the adhesion of the terminal electrode with respect to the ECA can be increased.

Preferably, in at least one of the dummy electrode layers, the plurality of outer layer dummy electrodes are provided, one end of each of these outer layer dummy electrodes is led onto the side surface of the ECA to be connected with the terminal electrode, and the outer layer dummy electrodes have the same polarity. According to this configuration, the adhesion of the terminal electrode with respect to the ECA can be further increased, and a short-circuit defect between the outer layer dummy electrodes can be prevented.

The present invention will be more fully understood from the detailed description given here in below and the accompanying drawings which are given by way of illustration only, and thus are not to be considered as limiting the present invention.

DETAILED DESCRIPTION OF THE PREFERRED EMBODIMENT

Figure 1:
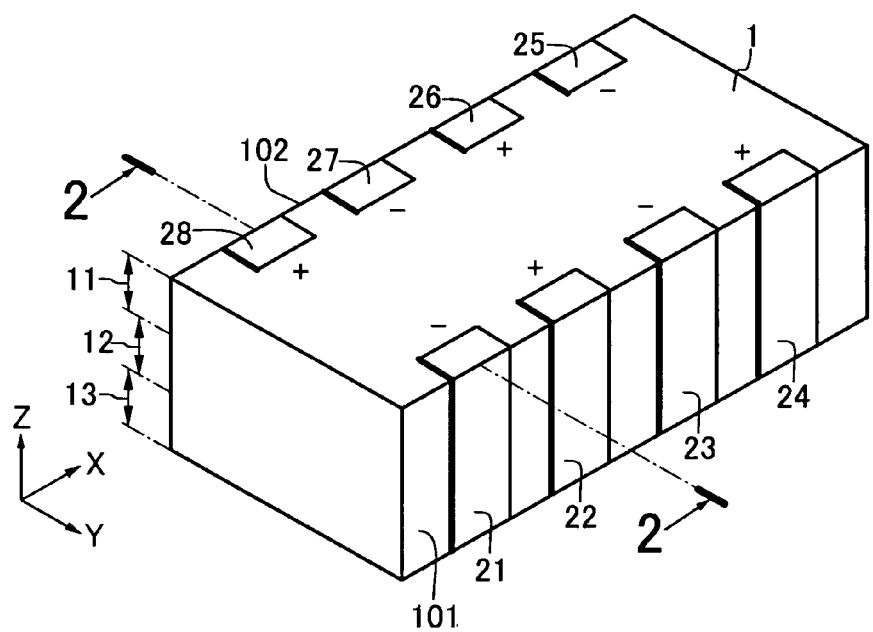
FIG. 1 is an appearance perspective view showing an embodiment of a laminated electronic component according to the present invention.

As shown in FIG. 1, the laminated electronic component according to the present invention includes a laminated ECA 1 and terminal electrodes 21 to 28. Although the present invention is applied to a multilayer ceramic capacitor in the illustrated embodiment, it can be applied to any other laminated electronic component, e.g., a multilayer inductor.

The terminal electrodes 21 to 28 are provided on side surfaces of the laminated ECA 1. Giving a detailed description, the laminated ECA 1 has a substantially rectangular parallelepiped shape, and the terminal electrodes 21 to 24 are provided on one side surface 101 of the laminated ECA 1. These terminal electrodes 21 to 24 are arranged on the side surface 101 at intervals in a length direction X, and adjacent terminal electrodes have polarities different from each other. Specifically, the terminal electrodes 21 and 23 have a negative polarity, and the terminal electrodes 22 and 24 have a positive polarity.

Likewise, the terminal electrodes 25 to 28 are provided on the other side surface 102 of the laminated ECA 1. These terminal electrodes 25 to 28 are arranged on the side surface 102 at intervals in the length direction X, and adjacent terminal electrodes have polarities different from each other. Specifically, the terminal electrodes 25 and 27 have a negative polarity, and the terminal electrodes 26 and 28 have a positive polarity.

The terminal electrodes 21 to 28 can be constituted of single-layer or multilayer plating films (212 to 282) and (213 to 283) on underlying films 211 to 281 obtained by applying an electroconductive paste on the laminated ECA 1 and baking this paste. Each of the underlying films 211 to 281 is configured to mainly contain, e.g., Cu or Ag, and the plating films are constituted of multilayer plating films (212 to 282) and (213 to 283) of, e.g., Ni/Sn.

Figure 2:
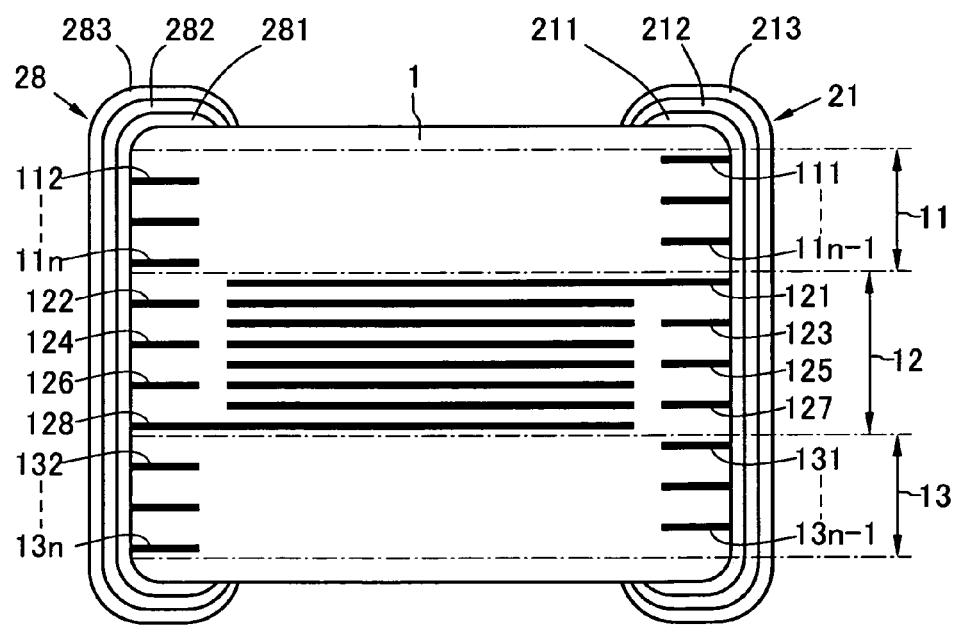
FIG. 2 is a pattern diagram showing a cross section taken along a line 2-2 in FIG. 1.

FIG. 2 is a pattern diagram showing a cross section taken along a line 2-2 in FIG. 1. As shown in the drawing, the laminated ECA 1 is provided with a plurality of electrode layers 121 to 128 superimposed with ceramic layers therebetween. Giving a detailed description, the laminated ECA 1 is constituted of an inner layer portion 12, a first outer layer portion 11 positioned above the inner layer portion 12 and a second outer layer portion 13 positioned below the inner layer portion 12, and the electrode layers 121 to 128 are arranged in the inner layer portion 12 of the laminated ECA 1. The ceramic layer is constituted of a dielectric layer or the like mainly containing, e.g., barium titanate, and each of the electrode layers 121 to 128 is constituted of, e.g., Ni.

Figure 3:
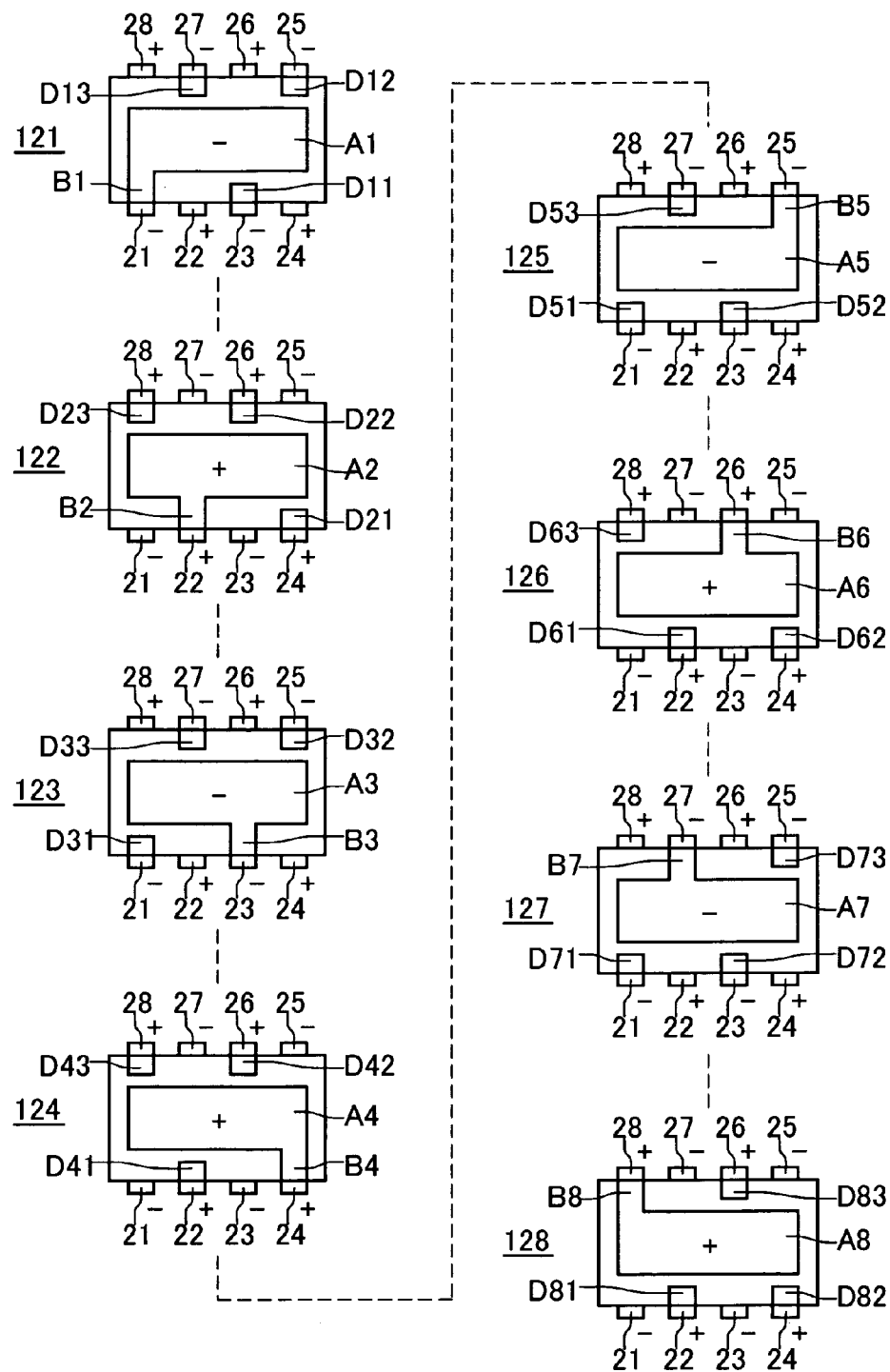
FIG. 3 is a pattern diagram showing a configuration of electrode layers included in the laminated electronic component according to the present invention.

FIG. 3 is a pattern diagram showing a configuration of the electrode layers 121 to 128. As shown in the drawing, the electrode layers 121 to 128 include internal electrodes A1 to A8, extraction electrodes B1 to B8, and dummy electrodes D11 to D83. The electrode layers 121 to 128 will now be sequentially described hereinafter.

First, giving a description on the electrode layer 121, the electrode layer 121 includes the internal electrode A1 and the extraction electrode B1. The internal electrode A1 is provided to face the internal electrode A2 of the electrode layer 122 with a ceramic layer therebetween, and functions as a capacitance electrode. One end of the extraction electrode B1 is connected with the internal electrode A1 in the same layer, and the other end of the same is led onto one side surface of the ECA to be connected with the terminal electrode 21. Therefore, the internal electrode A1 is electrically connected with the terminal electrode 21 through the extraction electrode B1, and hence has the same electrode as the terminal electrode 21, i.e., a negative polarity.

The electrode layer 121 further includes the dummy electrodes D11 to D13. The dummy electrodes D11 to D13 are respectively arranged apart from the internal electrode A1 and the extraction electrode B1 in the same layer. Additionally, each of these dummy electrodes D11 to D13 is connected with a terminal electrode selected from the terminal electrodes 21 to 28 in such a manner that it has the same polarity as seen from a relationship with the internal electrode A1 in the same layer. Giving a detailed description, the internal electrode A1 has a negative polarity, and one end of the dummy electrode D11 is led onto one side surface of the ECA to be connected with the terminal electrode 23 having a negative polarity. One end of each of the dummy electrodes D12 and D13 is led onto the other side surface of the ECA to be connected with each of the terminal electrodes 25 and 27 having a negative polarity.

Next, giving a description as to the electrode layer 122, the electrode layer 122 includes the internal electrode A2 and the extraction electrode B2. The internal electrode A2 is provided to face the internal electrode A1 of the electrode layer 121 and the internal electrode A3 of the electrode layer 123 with ceramic layers therebetween, and functions as a capacitance electrode. One end of the extraction electrode B2 is connected with the internal electrode A2 in the same layer, and the other end of the same is led onto one side surface of the ECA to be connected with the terminal electrode 22. Therefore, the internal electrode A2 is electrically connected with the terminal electrode 22 through the extraction electrode B2, and hence has the same polarity as the terminal electrode 22, i.e., a positive polarity.

The electrode layer 122 further includes the dummy electrodes D21 to D23, and the dummy electrodes D21 to D23 are respectively arranged apart from the internal electrode A2 and the extraction electrode B2 in the same layer. Further, each of these dummy electrodes D21 to D23 is connected with a terminal electrode selected from the terminal electrodes 21 to 28 in such a manner that it has the same polarity as seen from a relationship with the internal electrode A2 in the same layer. Giving a detailed description, the internal electrode A2 has a positive polarity, and one end of the dummy electrode D21 is led onto one side surface of the ECA to be connected with the terminal electrode 24 having a positive polarity. One end of each of the dummy electrodes D22 and D23 is led onto the other side surface of the ECA to be connected with each of the terminal electrodes 26 and 28 having a positive polarity.

This is also applied to the electrode layers 123 to 128, thereby eliminating the tautological explanation as much as possible.

Giving a description on the electrode layer 123, the internal electrode A3 is electrically connected with the terminal electrode 23 through the extraction electrode B3, and hence has the same polarity as the terminal electrode 23, i.e., a negative polarity. The dummy electrodes D31 to D33 are respectively connected with the terminal electrodes 21, 25 and 27 having a negative polarity in such a manner that they have the same polarity as seen from a relationship with the internal electrode A3 in the same layer.

Next, giving a description on the electrode layer 124, the internal electrode A4 is electrically connected with the terminal electrode 24 through the extraction electrode B4, and hence has the same polarity as the terminal electrode 24, i.e., a positive polarity. The dummy electrodes D41 to D43 are respectively connected with the terminal electrodes 22, 26 and 28 having a positive polarity in such a manner that they have the same polarity as seen from a relationship with the internal electrode A4 in the same layer.

Next, giving a description on the electrode layer 125, the internal electrode A5 is electrically connected with the terminal electrode 25 through the extraction electrode B5, and hence has the same polarity as the terminal electrode 25, i.e., a negative polarity. The dummy electrodes D51 to D53 are respectively connected with the terminal electrodes 21, 23 and 27 having a negative polarity in such a manner that they have the same polarity as seen from a relationship with the internal electrode A5 in the same layer.

Next, giving a description on the electrode layer 126, the internal electrode A6 is electrically connected with the terminal electrode 26 through the extraction electrode B6, and hence has the same polarity as the terminal electrode 26, i.e., a positive polarity. The dummy electrodes D61 to D63 are respectively connected with the terminal electrodes 22, 24 and 28 having a positive polarity in such a manner that they have the same polarity as seen from a relationship with the internal electrode A6 in the same layer.

Next, giving a description on the electrode layer 127, the internal electrode A7 is electrically connected with the terminal electrode 27 through the extraction electrode B7, and hence has the same polarity, i.e., a negative polarity. The dummy electrodes D71 to D73 are respectively connected with the terminal electrodes 21, 23 and 25 having a negative polarity in such a manner that they have the same polarity as seen from a relationship with the internal electrode A7 in the same layer.

At last, giving a description on the electrode layer 128, the internal electrode A8 is electrically connected with the terminal electrode 28 through the extraction electrode B8, and hence has the same polarity as the terminal electrode 28, i.e., a positive polarity. The dummy electrodes D81 to D83 are respectively connected with the terminal electrodes 22, 24 and 26 having a positive polarity in such a manner that they have the same polarity as seen from a relationship with the internal electrode A8 in the same layer.

As described above with reference to FIGS. 1 and 2, the laminated electronic component according to the present invention includes the laminated ECA 1 and the terminal electrodes 21 to 28 provided on the side surfaces of the ECA 1. The ECA 1 is provided with the plurality of electrode layers 121 to 128 superimposed with the ceramic layers therebetween. Therefore, a basic configuration of the laminated electronic component can be obtained.

Further, as described above with reference to FIG. 3, the electrode layers 121 to 128 include the internal electrodes A1 to A8 and the extraction electrodes B1 to B8. One end of each of these extraction electrodes is connected with the internal electrode in the same layer, and the other end of the same is led onto the side surface of the ECA 1 to be connected with the selected terminal electrode. For example, one end of the extraction electrode B1 is connected with the internal electrode A1 in the same layer, and the other end of the same is led onto the side surface of the ECA 1 to be connected with the terminal electrode 21. This is also applied to the other extraction electrodes B2 to B8. Therefore, there can be obtained a basic electric circuit extending from the terminal electrodes 21 to 28 on the side surfaces of the ECA to the internal electrodes A1 to A8 through the extraction electrodes B1 to B8.

The electrode layers 121 to 128 further include the dummy electrodes D11 to D83, and one end of each of these dummy electrodes is led onto the side surface of the ECA 1 to be connected with the selected terminal electrode. For example, one end of each of the dummy electrodes D31, D51 and D71 is led onto the side surface of the ECA 1 to be connected with the terminal electrode 21. Therefore, the terminal electrode 21 is provided with the connection structure with respect to the extraction electrode B1 as well as the connection structure with respect to the dummy electrodes D31, D51 and D71, and hence the terminal electrode 21 is appressed against the ECA 1 through the connection structure with respect to the dummy electrodes. This is also applied to the other terminal electrodes 22 to 28. Therefore, the small number of the extraction electrodes can be maintained to increase the ESR, and the adhesion of the terminal electrode with respect to the ECA can be increased.

Furthermore, the dummy electrodes D11 to D83 have the same polarity as seen from a relationship with the internal electrode in the same layer. For example, the dummy electrodes D11 to D13 have the same polarity, i.e., the negative polarity as seen from the relationship with the internal electrode A1 (the negative polarity) in the same layer. Therefore, a short-circuit defect between the internal electrode A1 and the dummy electrodes D11 to D13 can be prevented. This is also applied to the other internal electrodes A2 to A8.

Although the illustrated embodiment is configured to include the eight terminal electrodes 21 to 28 and the eight electrode layers 121 to 128, the present invention is not restricted to such a configuration, and the number of the terminal electrodes and the number of the electrode layers can take any arbitrary number equal to 2 or more than 2. This point will become apparent from the fact that the same function and effect can be obtained even in a configuration including two terminal electrodes and two electrode layers alone, for example.

Moreover, although the illustrated embodiment has the configuration in which each of the electrode layers 121 to 128 includes the internal electrode, the extraction electrode and the dummy electrodes, the present invention is not restricted to such a configuration. This point will become apparent from the fact that the same function and effect can be obtained even in a configuration where at least one of the electrode layers 121 to 128 does not include the dummy electrodes, for example.

Additionally, as described above with reference to FIG. 1, in regard to the terminal electrodes 21 to 24 provided on one side surface 101 of the laminated ECA 1, the adjacent terminal electrodes have different polarities. This is also applied to the terminal electrodes 25 to 28 provided on the other side surface 102, and such a configuration can reduce an ESL (an equivalent series inductance).

Again referring to FIGS. 1 and 2, a description will be given. The laminated ECA 1 includes two sets of dummy electrode layers 111 to 11$n$ and 131 to 13$n$ in outer layers as seen from the electrode layers 121 to 128 superimposed with the ceramic layers therebetween. In detail, one set of the dummy electrode layers 111 to 11$n$ is arranged in a first outer layer portion 11 positioned above the inner layer portion 12, and the other set of the dummy electrode layers 131 to 13$n$ is arranged in a second outer layer portion 13 positioned below the inner layer portion 12. The dummy electrode layers are constituted of, e.g., Ni, and superimposed with the ceramic layers therebetween. The dummy electrode layers 111 to 11$n$ arranged in the first outer layer portion 11 will now be described hereinafter on behalf of other dummy electrode layers.

Figure 4:
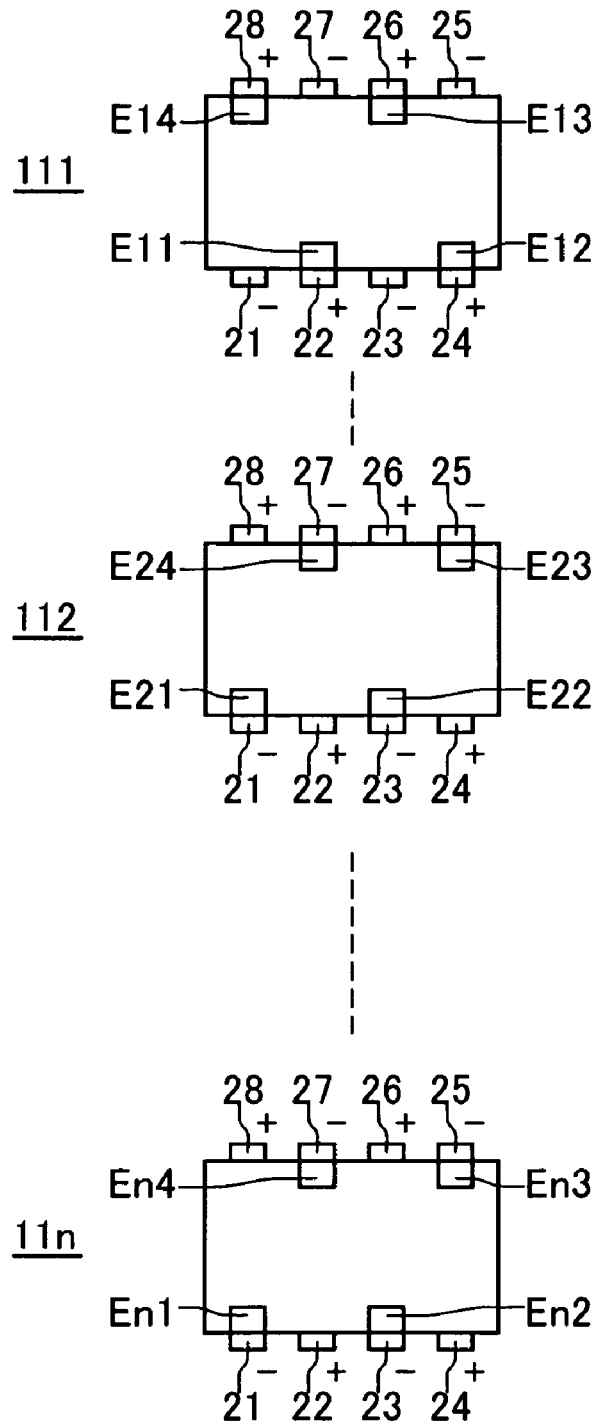
FIG. 4 is a pattern diagram showing a configuration of dummy electrode layers included in the laminated electronic component according the present invention.

FIG. 4 is a pattern diagram showing a configuration of the dummy electrode layers 111 to 11$n$. As shown in the drawing, the outer layer portion 11 includes the plurality of dummy electrode layers 111 to 11$n$ superimposed with the ceramic layers therebetween. Likewise, the other outer layer portion 13 includes the plurality of dummy electrode layers 131 to 13$n$ superimposed with the ceramic layers therebetween. The dummy electrode layer is constituted of, e.g., Ni. The ceramic layer is as described above. The dummy electrode layers 111 to 11$n$ in the outer layer portion 11 will now be described on behalf of other dummy electrode layers.

The dummy electrode layer 111 will be first explained. The dummy electrode layer 111 includes outer layer dummy electrodes E11 to E14, and one end of each of the outer layer dummy electrodes E11 to E14 is led onto the side surface of the ECA 1 to be connected with a terminal electrode selected from the terminal electrodes 21 to 28. Preferably, the outer layer dummy electrodes E11 to E14 are configured to have the same polarity. As an example of such a configuration, the outer layer dummy electrodes E11 and E12 are led onto one side surface of the ECA 1 to be respectively connected with the terminal electrodes 22 and 24 having the positive polarity, and the outer layer dummy electrodes E13 and E14 are led onto the other side surface of the ECA 1 to be respectively connected with the terminal electrodes 26 and 28 having the positive polarity.

The dummy electrode layer 112 will now be described. The dummy electrode layer 112 includes outer layer dummy electrodes E21 to E24, and one end of each of the outer layer dummy electrodes E21 to E24 is led onto the side surface of the ECA 1 to be connected with a terminal electrode selected from the terminal electrodes 21 to 28. Preferably, the outer layer dummy electrodes E21 to E24 are configured to have the same polarity. As an example of such a configuration, the outer layer dummy electrodes E21 and E22 are led onto one side surface of the ECA 1 to be respectively connected with the terminal electrodes 21 and 23 having the negative polarity, and the outer layer dummy electrodes E23 and E24 are led onto the other side surface of the ECA 1 to be respectively connected with the terminal electrodes 25 and 27 having the negative polarity.

The dummy electrode layers 113 to 11$n$ can have the same configuration. For example, of the dummy electrode layers 113 to 11$n$, layers having odd reference numbers can have the same configuration as the dummy electrode layer 111, And of the dummy electrode layers 113 to 11$n$, layers having even reference numbers can have the same configuration as the dummy electrode layer 112.

Further, the dummy electrode layers 131 to 13n in the other outer layer portion 13 can have the same configuration as the dummy electrode layers 111 to 11n in the outer layer portion 11. For example, the dummy electrode layers 131 to 13n can have the same configuration as the dummy electrode layers 11n to 111 so that these layers have a symmetrical configuration with the electrode layers 121 to 128 in the inner layer portion 12 therebetween.

Furthermore, each of the number of the dummy electrode layers arranged in the outer layer portion 11 and the number of the dummy electrode layers arranged in the other outer layer portion 13 can take an arbitrary number.

As described above, the outer layer portion 11 of the laminated ECA 1 includes the dummy electrode layers 111 to 11n. These dummy electrode layers 111 to 11n include the outer layer dummy electrodes, and one end of each outer layer dummy electrode is led onto the side surface of the ECA 1 to be connected with a terminal electrode selected from the terminal electrodes 21 to 28. For example, the outer layer dummy electrode E21 in the dummy electrode layer 112 is connected with the terminal electrode 21. Therefore, the terminal electrode 21 is provided with the connection structure with respect to the extraction electrode B1 as well as the connection structure with respect to the outer layer dummy electrode E21, and hence the terminal electrode 21 is appressed against the ECA 1 through these connection structures. This is also applied to the other terminal electrodes 22 to 28. Therefore, a short-circuit defect can be prevented, and the adhesion of each terminal electrode with respect to the ECA can be increased.

Although the illustrated embodiment is provided with the eight terminal electrodes 21 to 28, the present invention is not restricted to such a configuration, and the number of the terminal electrodes can take an arbitrary number equal to 2 or more than 2. This point will become apparent from the fact that the same function and effect can be obtained even in a configuration including two terminal electrodes alone.

Moreover, although the illustrated embodiment is provided with the eight electrode layers 121 to 128, the present invention is not restricted to such a configuration, and the number of the electrode layers can take an arbitrary number equal to 2 or more than 2.

Each of the number of the dummy electrode layers arranged in the first outer layer portion 11 and the number of the dummy electrode layers arranged in the second outer layer portion 13 can take an arbitrary number. Although the illustrated embodiment has the configuration in which the second dummy electrodes having the same polarity alone are provided in each of the dummy electrode layers, this embodiment is not restricted to such a configuration. For example, one of the dummy electrode layers may be provided with both the second dummy electrode having a positive polarity and the second dummy electrode having a negative polarity. That is, one of the dummy electrode layers may be provided with both the second dummy electrode connected with the terminal electrode having the positive polarity and the second dummy electrode connected with the terminal electrode having the negative polarity.

Figure 5:
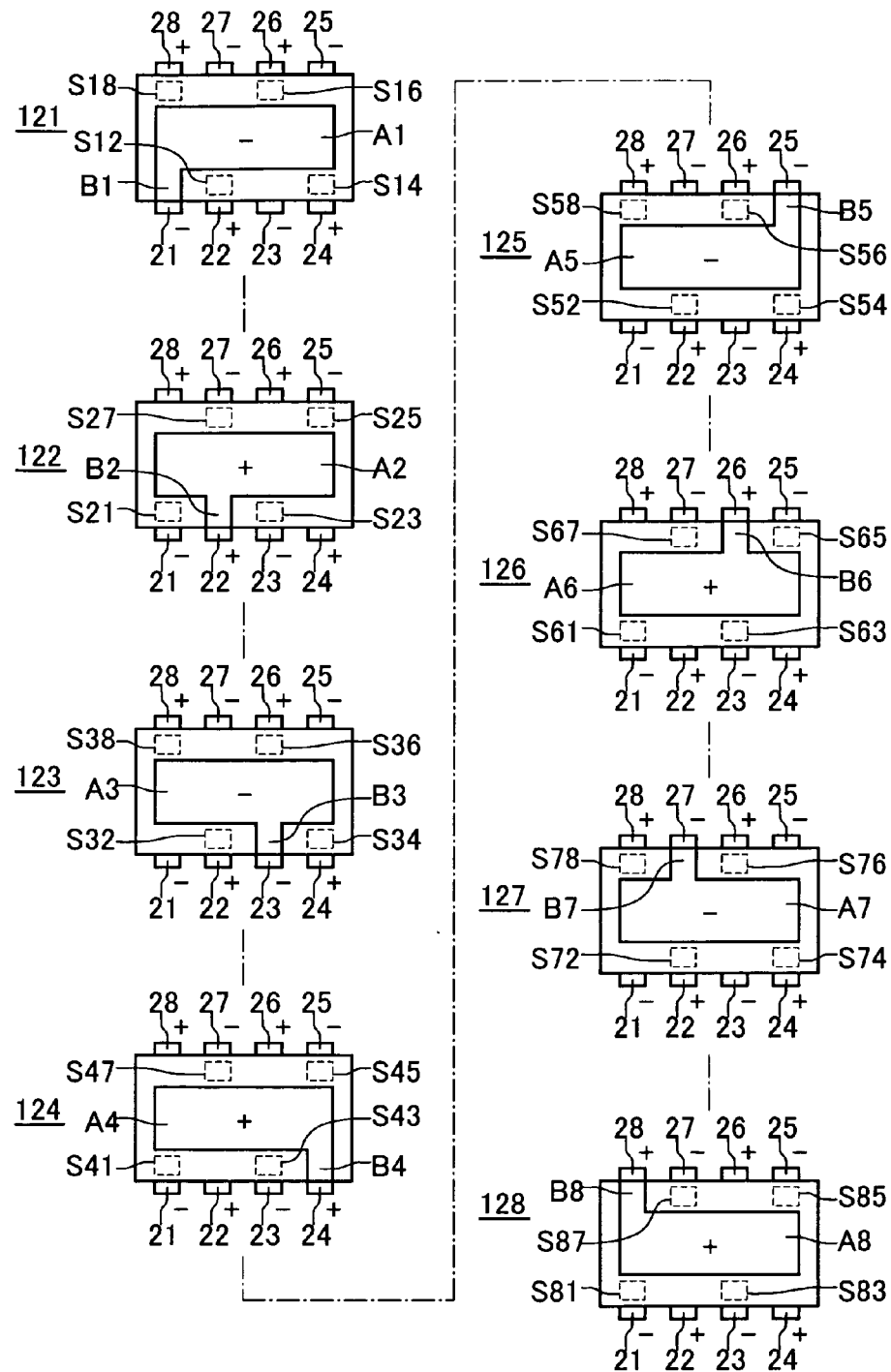
FIG. 5 is a pattern diagram showing another configuration of the electrode layers included in the laminated electronic component according to the present invention.

FIG. 5 is a pattern diagram showing a configuration of electrode layers in still another embodiment of the laminated electronic component according to the present invention. As shown in the drawing, electrode layers 121 to 128 include internal electrodes A1 to A8 and extraction electrodes B1 to B8. The electrode layers 121 to 128 will now be sequentially described hereinafter.

First, giving a description on the electrode layer 121, the electrode layer 121 includes the internal electrode A1 and the extraction electrode B1. The internal electrode A1 is provided to face the internal electrode A2 in the electrode layer 122 with a ceramic layer therebetween, and functions as a capacitance electrode. One end of the extraction electrode B1 is connected with the internal electrode A1 in the same layer, and the other end of the same is led onto one side surface of the ECA to be connected with a terminal electrode 21. Therefore, the internal electrode A1 is electrically connected with the terminal electrode 21 through the extraction electrode B1, and hence has the same polarity as the terminal electrode 21, i.e., a negative polarity.

A dummy electrode is not provided in a region between the internal electrode A1 and a terminal electrode having a polarity different from that of the internal electrode A1. In detail, the internal electrode A1 has the negative polarity, and a dummy electrode is not provided in regions S12, S14, S16 and S18 between the internal electrode A1 and terminal electrodes 22, 24, 26 and 28 having a positive polarity.

Next, giving a description on the electrode layer 122, the electrode layer 122 includes the internal electrode A2 and the extraction electrode B2. The internal electrode A2 is provided to face the internal electrode A1 in the electrode layer 121 and the internal electrode A3 in the electrode layer 123 with ceramic layers therebetween, and functions as a capacitance electrode. One end of the extraction electrode B2 is connected with the internal electrode A2 in the same layer, and the other end of the same is led onto one side surface of the ECA to be connected with a terminal electrode 22. Therefore, the internal electrode A2 is electrically connected with the terminal electrode 22 through the extraction electrode B2, and hence has the same polarity as the terminal electrode 22, i.e., a positive polarity.

A dummy electrode is not provided in a region between the internal electrode A2 and a terminal electrode having a polarity different from that of the internal electrode A2. In detail, the internal electrode A2 has the positive polarity, and a dummy electrode is not provided in regions S21, S23, S25 and S27 between the internal electrode A2 and terminal electrodes 21, 23, 25 and 27 having a negative polarity.

This is also applied to the electrode layers 123 to 128, and the tautological explanation concerning these layers will be eliminated as much as possible.

Giving a description on the electrode layer 123, the internal electrode A3 is electrically connected with the terminal electrode 23 through the extraction electrode B3, and hence has the same polarity as the terminal electrode 23, i.e., the negative polarity. A dummy electrode is not provided in regions S32, S34, S36 and S38 between the internal electrode A3 and the terminal electrodes 22, 24, 26 and 28 having the positive polarity.

Next, giving a description on the electrode layer 124, the internal electrode A4 is electrically connected with the terminal electrode 24 through the extraction electrode B4, and hence has the same polarity as the terminal electrode 24, i.e., the positive polarity. A dummy electrode is not provided in regions S41, S43, S45 and S47 between the internal electrode A4 and the terminal electrodes 21, 23, 25 and 27 having the negative polarity.

Next, giving a description on the electrode layer 125, the internal electrode A5 is electrically connected with the terminal electrode 25 through the extraction electrode B5, and hence has the same polarity as the terminal electrode 25, i.e., the negative polarity. A dummy electrode is not provided in regions S52, S54, S56 and S58 between the internal electrode A5 and the terminal electrodes 22, 24, 26 and 28 having the positive polarity.

Next, giving a description on the electrode layer 126, the internal electrode A6 is electrically connected with the terminal electrode 26 through the extraction electrode B6, and hence has the same polarity as the terminal electrode 26, i.e., the positive polarity. A dummy electrode is not provided in regions S61, S63, S65 and S67 between the internal electrode A6 and the terminal electrodes 21, 23, 25 and 27 having the negative polarity.

Next, giving a description on the electrode layer 127, the internal electrode A7 is electrically connected with the terminal electrode 27 through the extraction electrode B7, and hence has the same polarity as the terminal electrode 27, i.e., the negative polarity. A dummy electrode is not provided in regions S72, S74, S76 and S78 between the internal electrode A7 and the terminal electrodes 22, 24, 26 and 28 having the positive polarity.

At last, giving a description on the electrode layer 128, the internal electrode A8 is electrically connected with the terminal electrode 28 through the extraction electrode B8, and hence has the same polarity as the terminal electrode 28, i.e., the positive polarity. A dummy electrode is not provided in regions S81, S83, S85 and S87 between the internal electrode A8 and the terminal electrodes 21, 23, 25 and 27 having the negative polarity.

Moreover, as described above with reference to FIG. 3, the electrode layers 121 to 128 include the internal electrodes A1 to A8 and the extraction electrodes B1 to B8. One end of each of these extraction electrodes is connected with the internal electrode in the same layer, and the other end of the same is led onto the side surface of the ECA 1 to be connected with the selected terminal electrode. For example, one end of the extraction electrode B1 is connected with the internal electrode A1 in the same layer, and the other end of the same is led onto the side surface of the ECA 1 to be connected with the terminal electrode 21. This is also applied to the other extraction electrodes B2 to B8. Therefore, it is possible to obtain a basic electric circuit extending from the terminal electrodes 21 to 28 on the side surfaces of the ECA to the internal electrodes A1 to A8 through the extraction electrodes B1 to B8.

As characteristics of the present invention, the dummy electrode is not provided in a region between the internal electrode and the terminal electrode having a polarity different from that of the internal electrode. For example, giving a description on the electrode layer 121, the dummy electrode is not provided in the regions S12, S14, S16 and S18 between the internal electrode A1 and the terminal electrodes 22, 24, 26 and 28 having a polarity different from that of the internal electrode A1. This is also applied to the other electrode layers 122 to 128. Therefore, a short-circuit defect between the internal electrode and the dummy electrode can be prevented.

Figure 6:
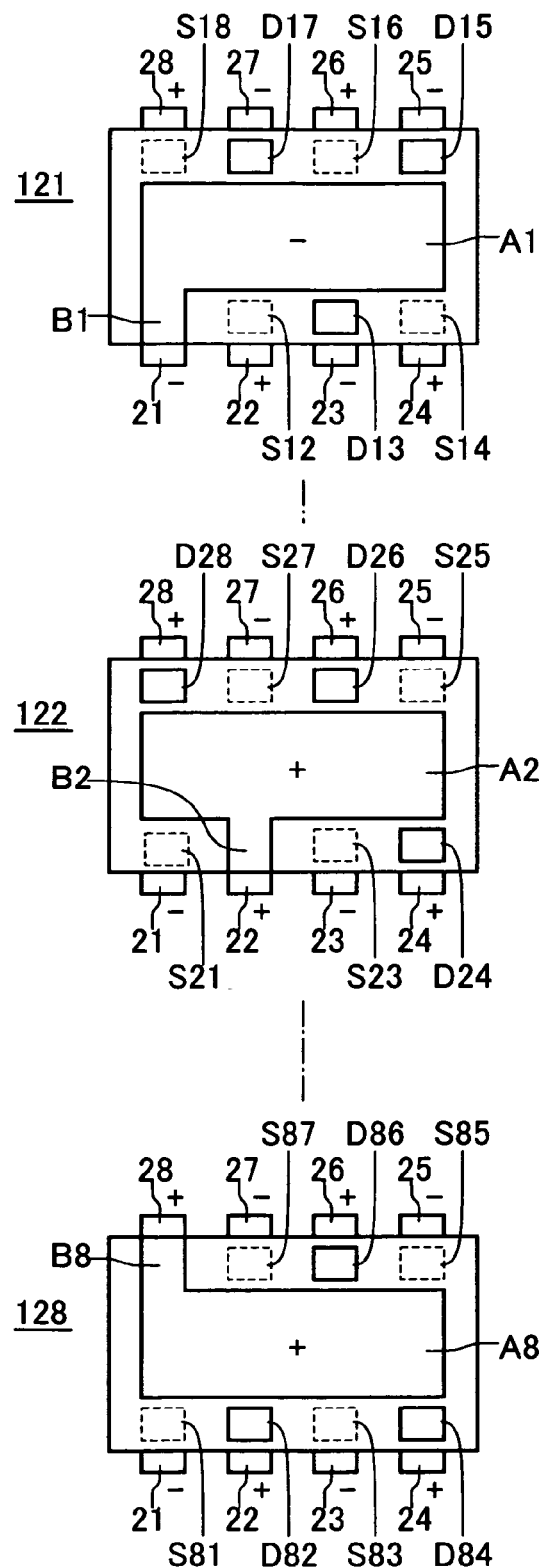
FIG. 6 is a pattern diagram showing still another configuration of the electrode layers included in the laminated electronic component according to the present invention.

FIG. 6 is a pattern diagram showing a configuration of electrode layers in another embodiment of the laminated electronic component according to the present invention. In the drawing, same reference numerals denote the same type of constituent parts as those in the foregoing drawings, thereby eliminating the tautological explanation as much as possible. In comparison with the embodiment shown in FIG. 3, this embodiment is characterized in that each of electrode layers 121 to 128 includes dummy electrodes provided in regions between an internal electrode and terminal electrodes having the same polarity as the internal electrode. The electrode layers 121 to 128 will now be sequentially described hereinafter.

The electrode layer 121 includes dummy electrodes provided in regions between an internal electrode A1 and terminal electrodes having the same polarity as the internal electrode A1. In more detail, the internal electrode A1 has a negative polarity, and dummy electrodes D13, D15 and D17 are respectively provided in regions between the internal electrode A1 and terminal electrodes 23, 25 and 27 having a negative polarity. Each of the dummy electrodes D13, D15 and D17 functions to compensate a thickness in a region where the internal electrode A1 or an extraction electrode B1 is not provided.

Next, the electrode layer 122 includes dummy electrodes provided in regions between an internal electrode A2 and terminal electrodes having the same polarity as the internal electrode A2. In more detail, the internal electrode A2 has a positive polarity, and dummy electrodes D24, D26 and D28 are respectively provided in regions between the internal electrode A2 and terminal electrodes 24, 26 and 28 having a positive polarity. Each of the dummy electrodes D24, D26 and D28 functions to compensate a thickness in a region where the internal electrode A2 or the extraction electrode B2 is not provided. This is also applied to the electrode layers 123 to 128, thereby eliminating the tautological description.

While the present invention has been particularly shown and described with reference to preferred embodiments thereof, it will be understood by those skilled in the part that various changes in form and detail may be made therein without departing from the spirit, scope and teaching of the invention.

What is claimed is:

1. A laminated electronic component comprising: an electronic component element assembly; and a terminal electrode provided on a side surface of the electronic component element assembly,
    wherein the electronic component element assembly comprises a plurality of electrode layers superimposed with ceramic layers therebetween, the electrode layer including an internal electrode, an extraction electrode and a dummy electrode,
    one end of the extraction electrode is connected with the internal electrode in the same layer, whilst the other end of the same is led onto the side surface of the electronic component element assembly to be connected with the terminal electrode, and
    the dummy electrode is arranged apart from the internal electrode and the extraction electrode in the same layer, has one end led onto the side surface of the electronic component element assembly to be connected with the terminal electrode, and has the same polarity as seen from a relationship with the internal electrode in the same layer.

2. The laminated electronic component according to claim 1, wherein at least one of the electrode layers includes the plurality of dummy electrodes, and each of the dummy electrodes is arranged apart from the internal electrode and the extraction electrode in the same layer, has one end led onto the side surface of the electronic component element assembly to be connected with the terminal electrode and has the same polarity as seen from a relationship with the internal electrode in the same layer.

3. The laminated electronic component according to claim 2, wherein the terminal electrode comprises a plurality of terminal electrodes provided on side surfaces of the electronic component element assembly, and the terminal electrodes adjacent to each other on the side surface of the electronic component element assembly have different polarities.

4. The laminated electronic component according to claim 3, wherein the electronic component element assembly comprises dummy electrode layers in outer layers as seen from the electrode layers superimposed with the ceramic layers therebetween, and
    the dummy electrode layer includes a second dummy electrode, the second dummy electrode having one end led onto the side surface of the electronic component element assembly to be connected with the terminal electrode.

5. The laminated electronic component according to claim 3, wherein at least one of the dummy electrode layers comprises a plurality of second dummy electrodes, and each of the second dummy electrodes has one end led onto the side surface of the electronic component element assembly to be connected with the terminal electrode and has the same polarity.

6. The laminated electronic component according to claim 2, wherein the electronic component element assembly comprises dummy electrode layers in outer layers as seen from the electrode layers superimposed with the ceramic layers therebetween, and
the dummy electrode layer includes a second dummy electrode, the second dummy electrode having one end led onto the side surface of the electronic component element assembly to be connected with the terminal electrode.

7. The laminated electronic component according to claim 1, wherein the terminal electrode comprises a plurality of terminal electrodes provided on side surfaces of the electronic component element assembly, and the terminal electrodes adjacent to each other on the side surface of the electronic component element assembly have different polarities.

8. The laminated electronic component according to claim 7, wherein the electronic component element assembly comprises dummy electrode layers in outer layers as seen from the electrode layers superimposed with the ceramic layers therebetween, and
the dummy electrode layer includes a second dummy electrode, the second dummy electrode having one end led onto the side surface of the electronic component element assembly to be connected with the terminal electrode.

9. The laminated electronic component according to claim 3, wherein at least one of the dummy electrode layers comprises a plurality of second dummy electrodes, and each of the second dummy electrodes has one end led onto the side surface of the electronic component element assembly to be connected with the terminal electrode and has the same polarity.

10. The laminated electronic component according to claim 1, wherein the electronic component element assembly comprises dummy electrode layers in outer layers as seen from the electrode layers superimposed with the ceramic layers therebetween, and
the dummy electrode layer includes a second dummy electrode, the second dummy electrode having one end led onto the side surface of the electronic component element assembly to be connected with the terminal electrode.

11. A laminated electronic component comprising: an electronic component element assembly; and a terminal electrode provided on a side surface of the electronic component element assembly,
wherein the electronic component element assembly includes an inner layer portion and an outer layer portion,
the inner layer portion comprises a plurality of electrode layers superimposed with ceramic layers therebetween,
each of the electrode layers includes an internal electrode and an extraction electrode, the extraction electrode having one end connected with the internal electrode in the same layer and the other end led onto the side surface of the electronic component element assembly to be connected with the terminal electrode, no dummy electrode being provided in a region between the internal electrode and the terminal electrode having a polarity different from that of the internal electrode,
the outer layer portion comprises dummy electrode layers, and
the dummy electrode layer includes an outer layer dummy electrode, one end of the outer layer dummy electrode being led onto the side surface of the electronic component element assembly to be connected with the terminal electrode.

12. The laminated electronic component according to claim 11, wherein at least one of the dummy electrode layers comprises the plurality of outer layer dummy electrodes, and the outer layer dummy electrodes have the same polarity.

13. The laminated electronic component according to claim 12, wherein the electrode layer includes a dummy electrode, and the dummy electrode is arranged apart from the internal electrode and the extraction electrode in the same layer, has one end led onto the side surface of the electronic component element assembly to be connected with the terminal electrode and has the same polarity as seen from a relationship with the internal electrode in the same layer.

14. The laminated electronic component according to claim 13, wherein the terminal electrode comprises a plurality of terminal electrodes provided on side surfaces of the electronic component element assembly, and the terminal electrodes adjacent to each other on the side surface of the electronic component element assembly have different polarities.

15. The laminated electronic component according to claim 12, wherein the terminal electrode comprises a plurality of terminal electrodes provided on side surfaces of the electronic component element assembly, and the terminal electrodes adjacent to each other on the side surface of the electronic component element assembly have different polarities.

16. The laminated electronic component according to claim 11, wherein the electrode layer does not include a dummy electrode.

17. The laminated electronic component according to claim 16, wherein the terminal electrode comprises a plurality of terminal electrodes provided on side surfaces of the electronic component element assembly, and the terminal electrodes adjacent to each other on the side surface of the electronic component element assembly have different polarities.

18. The laminated electronic component according to claim 11, wherein the electrode layer includes a dummy electrode, and the dummy electrode is arranged apart from the internal electrode and the extraction electrode in the same layer, has one end led onto the side surface of the electronic component element assembly to be connected with the terminal electrode and has the same polarity as seen from a relationship with the internal electrode in the same layer.

19. The laminated electronic component according to claim 18, wherein the terminal electrode comprises a plurality of terminal electrodes provided on side surfaces of the electronic component element assembly, and the terminal electrodes adjacent to each other on the side surface of the electronic component element assembly have different polarities.

20. The laminated electronic component according to claim 11, wherein the terminal electrode comprises a plurality of terminal electrodes provided on side surfaces of the electronic component element assembly, and the terminal electrodes adjacent to each other on the side surface of the electronic component element assembly have different polarities.

* * * * *